Patented Jan. 15, 1952

2,582,264

UNITED STATES PATENT OFFICE 2,582,264

SOFTENING AGENT FOR RUBBER AND RESULTANT RUBBER COMPOSITION

Frank M. McMillan and De Loss E. Winkler, Berkeley, Calif., assignors to Shell Development Company, San Francisco, Calif., a corporation of Delaware No Drawing. Application June 25, 1949, Serial No. 101,503

9 Claims. (Cl. 260—761)

This invention provides novel softening ingredients for use in the working of rubbers, and it is also directed to the resulting rubber compositions.

As employed, herein, the term "rubber" embraces both natural rubber, in all its various raw and reclaimed forms, as well as the various synthetic rubbers, i. e. rubbery polymers, of the type which may be vulcanized with sulfur. Representative synthetic rubbery polymers of this variety are the homopolymerization products of butadiene and those of its homologues and derivatives, as, for example, methyl butadiene, dimethyl butadiene, pentadiene, and chloroprene (neoprene synthetic rubber), as well as copolymers such as those formed from butadiene, or its homologues or derivatives, with other unsaturated organic compounds. Among the latter are acetylenes, as vinyl acetylene; olefins, as isobutylene, which copolymerizes with butadiene to form butyl synthetic rubber; vinyls, as vinyl chloride, acrylic acid, acrylonitrile (which polymerizes with butadiene to form the synthetic rubber Buna N), methacrylic acid and styrene, the latter compound polymerizing with butadiene to form the synthetic rubber Buna S as well as vinyl esters and various unsaturated aldehydes, ketones and ethers, e. g. acrolein, methyl isopropenyl ketone, and vinyl ethyl ether. The foregoing rubber materials, including both natural rubber as well as the various synthetic rubbers, may be defined as "rubbery polymers of at least one compound selected from the group consisting of the conjugated diolefins and chloroprene."

Rubber compositions of a type suitable to be vulcanized are prepared by blending with the rubber stock a number of other ingredients. However, the physical condition of said stocks is usually such that this compounding may be effected only as the rubber is masticated on a mill or in a mixer until it becomes plastic. This mastication process is normally productive of large amounts of heat, with the result that there is danger of prematurely vulcanizing the composition. However, the amounts of heat generated in this fashion may be considerably reduced by adding to the rubber being worked one or more oils, fats, waxes, tars, or the like which have an affinity for rubber and act to swell and soften the same, thereby accelerating the mechanical action of the mixer.

The effectiveness of the foregoing softening agents varies greatly from one material to another, some acting principally to reduce the amount of heat generated during the mixing process, while others impart tackiness to the mixture and thereby increase its homogeneity and overall workability. Still others have important scorch retarding properties and thereby reduce the tendency of the rubber stock to become vulcanized at the temperatures normally encountered during working on the mill without affecting the cure rate at the higher temperatures employed in the subsequent vulcanization steps. Some few softening agents possess more than one of these qualities in some measure, but only an extremely limited number of such compounds are sufficiently well rounded as to be regarded as all-purpose softeners. One such material is pine tar, a composition which finds particular utility in connection with various tire stocks as well as with rubber compositions used for other purposes, and it is an object of this invention to provide an economical material of petroleum origin which will have all the desirable attributes of pine tar and may be employed as a substitute therefore either in whole or in part.

It is our discovery that a composition made up of from about 15 to 60% naphthenic acids and at least 15% petroleum residues of hereinafter defined composition, with the balance of the composition being essentially comprised of a neutral oil, represents an excellent softener for use in both natural as well as synthetic rubbers. This composition not only has the ability to soften the mass and supply the desired condition of tackiness, but it also decreases the scorchiness of the rubber and permits the effective compounding thereof at normal operating temperatures. The resulting composition has a high Mooney scorch time coupled with a good elastic recovery or nerve. The vulcanizate prepared from rubber compositions incorporating the softener of this invention is characterized by a normal modulus of elongation and a relative high tear strength. In short, both the unvulcanized as well as vulcanized compositions prepared with the naphthenic acid-petroleum residue softener of this invention possess all the desirable attributes of those compounded with pine tar and in some respects are even superior to the latter.

The naphthenic acids employed in this invention are compounds of the type derived on the acidification of alkali extract of crude petroleum oils or their distillates. The mixture of acids obtained in this fashion may either be used as such, in which case it may normally contain from about 20 to 40% by weight of a neutral oil, or it may first be subjected to a preliminary refining operation to reduce its oil content and/or to remove the lower boiling acid members. While the structure of the various naphthenic acids comprising such mixtures is not susceptible of complete definition, the relatively lower boiling acids present therein may generally be described as monocarboxylic alkylated derivatives of cyclopentane and cyclohexane which contain from 8 to 12 carbon atoms in the molecule, whereas the higher boiling acids, which usually are also of the monocarboxylic variety, are polycyclic in character and contain up to 30 carbon atoms in the molecule. The naphthenic acid mixtures preferably employed in forming the rubber softeners of this invention are those having an average acid number of from about 100 to 250 as measured on an oil-free basis. As employed herein, the acid number is expressed in terms of the number of milligrams of potassium hydroxide required to neutralize one gram of the naphthenic acid.

The petroleum residues which are combined with the naphthenic acids to form the softeners of this invention are high molecular weight, aromatic and naphthenic hydrocarbons which may or may not contain sulfur and which are obtained as residues and extracts in processes involving removal of light ends and the various lubricating oil fractions from crude oils. Included among the said products are the various residual asphalts, either per se or in the form of liquid emulsions or solutions with an oil distillate, as well as the liquid extracts obtained by treating the oil with agents of the type of sulfur dioxide, furfural, phenol, propane, cresol or the like. These petroleum residues vary in viscosity from about 10 cs. at 210° F. up to more or less solid asphaltic compositions softening at about 100 to 200° F., and in specific gravity ($d_4^{20}$) from about 0.9 to 1.05. Their initial boiling point is at least 300° F. at 1 mm. Hg. Because of the predominantly aromatic character of the herein-defined residues, the same may otherwise be described as "aromatic petroleum derivatives," i. e., as aromatic fractions derived from naturally occurring, as well as cracked petroleum stocks.

In compounding the softeners of the invention, these various petroleum residues may be employed either singly or in combination. Thus, excellent results have been obtained by the use in rubbers of a mixture made up of unrefined naphthenic acids and an asphaltic type residue, and optionally with a so-called neutral, or volatile petroleum oil. Again, good results have also been obtained by employing the naphthenic acid in combination with a solution of an asphaltic residue in a Duosol, Edleaneau, or furfural extract. Likewise, it is also possible to omit the asphaltic component altogether and to obtain a good rubber softening agent by employing as the petroleum residue one or more of the said Duosol, Edleaneau or furfural extracts in combination with the naphthenic acid mixture. However, it is preferred not to omit the asphaltic residue altogether from the softening composition.

The naphthenic acid and petroleum residue components of the softener may be added to the rubber either separately or in the form of a previously prepared composition. In either case, however, it is important that the overall naphthenic acid content of the softener not exceed about 60%, for with larger amounts there ensues an undesirable increase in the modulus of the final vulcanizate, i. e., the vulcanized articles become stiffer than would otherwise be the case and a greater force is required to stretch them in any predetermined amount. On the other hand, the naphthenic acid content of the softener should not fall below about 15% for there then ensues a rapid increase in the scorchability of the stock together with an impairment of its tackiness and overall workability. A preferred proportional range for the softener ingredients is from 20 to 40% by weight of naphthenic acids and from 60 to 80% by weight of petroleum residue together with any neutral petroleum oil (i. e. any volatile or distillable petroleum oil) present. In the latter connection, it is to be observed that the neutral petroleum oil, which frequently acts as a base or solvent for the naphthenic acid, asphalt, or other petroleum residue, may be present in an amount up to about 50% of the overall weight of the softener without deleterious effects, provided that the composition shall always contain at least about 15% of the petroleum residue, in addition to its content of naphthenic acid. The various percentages expressed herein for the naphthenic acid and petroleum residue components of the softeners are on an "oil-free" basis.

The information presented in the preceding paragraph brings out the unexpected non-linearity of rubber properties with changing proportions of the naphthenic acid and petroleum residue components of the softener. That is to say, a blend containing 30% naphthenic acids together with 70% petroleum residue and any neutral petroleum oil present retains the high Mooney scorch time and most of the tack of a stock softened only with naphthenic acid (or with naphthenic acid plus neutral oil), while at the same time the modulus of the vulcanizate is reduced to a normal level as compared with the abnormally high value which prevails when the petroleum residue is omitted.

In working up the rubber with the softener, the components of the latter are added to the rubber either separately or in the form of previously prepared liquids or semi-liquids, followed by thorough mixing to attain a mass of the desired plasticity and tackiness, after which the other compounding ingredients are normally worked into the product. The resulting mixture is then subjected to the desired shaping and vulcanizing operations. The amount of softener to be employed is susceptible of considerable variation, depending both on the nature of this additive as well as on that of the rubber and other compounding ingredients used. However, good results are obtained by using from about 2 to 20 parts of the softening composition for each 100 parts of rubber, and preferably there are employed from 5 to 10 parts of the softener for each 100 parts of the rubber.

Subject to the proportional limits described above, any one or more of the various naphthenic acid mixtures and petroleum residues known in the art may be incorporated to advantage with any organic, rubbery polymer capable of being vulcanized with sulfur. As was pointed out above, this class of compounds includes not only the various natural rubbers, but also the synthetic rubbers prepared in whole or in part from conjugated diolefins or chloroprene. Combinations of both natural and synthetic rubbers may also be used.

The new vulcanizable compositions of this invention comprise homologous mixtures of one or more of the above-identified softeners with one or more rubbers, or rubbery polymers, of the type vulcanizable with sulfur, and with or without other rubber compounding ingredients as noted below. Such mixtures may be produced by any known method, including blending on a roll mill or Banbury mixer. The raw rubbers are sometimes supplied in the form of an emulsion in water or other liquid, as in the case of latex natural rubber. The softening compositions of this invention may be added to such emulsions either per se or in the form of other emulsions, after which the mass is precipitated and worked up in a manner known in the art.

In addition to the softening ingredient, the vulcanizable composition normally contains other additives, of which one is necessarily the vulcanizing agent. Suitable agents of this character are sulfur, sulfur chloride, sulfur thiocyanate, thiuram polysulfides and other organic or inorganic polysulfides, organic and inorganic peroxides, halogen-containing compounds and nitrogen-containing compounds such as the nitrobenzenes.

Vulcanization accelerators and accelerator-activators may be present, particularly when sulfur-containing compounds are ingredients of the compositions. Illustrative examples of accelerators are tetramethyl thiuram disulfide, zinc dibutyl dithiocarbamate, tetramethyl thiuram monosulfide, dipentamethylene-thiuram tetrasulfide, mercapto benzo thiazole, hexamethylene-tetramine, aldehyde-ammonia, diphenylguanidine, diphenylthiourea, benzo thiazyl disulfide, piperidinium pentamethylene-dithiocarbamate di-o-tolylguanidine and lead dimethyldithiocarbamate. The metal oxides such as zinc oxide and lead oxides are frequently added as accelerator-activators.

While the softening agents of the present invent exhibit a plasticizing as well as softening and tackifying action, in some cases it may also be desirable to use additional plasticizers of which dibutyl phthalate, dioctyl phthalate, tricresyl phosphate, triacetin, tetralin, cumar resins, soft factice, wool gloss, stearic acid, and lauric acid are examples. Pine tar itself may comprise a portion up to 50% of the softening agent composition.

Having compounded the rubber by mixing therewith the above-described materials, the mix is vulcanized by treatment at elevated temperatures, preferably above 100° C., for periods varying from several minutes to one or more hours. Preferred vulcanizing treatments are those conducted at temperatures of from 125 to 175° C. for from 15 to 45 minutes.

Compositions can be produced in accordance with the invention which are capable of use for substantially all of the purposes for which other rubber-like compositions are employed. Examples which come readily to mind are automobile tires and tubes, floor tilings, balloon coverings, umbrellas, raincoats, table covers, shower curtains, garment bags, electrical insulation, friction tape, hose for the handling of aqueous substances and of petroleum products and paints, lining and exterior coating in self-sealing gasoline tanks, gaskets, belts, shoe soles and heels, aprons, gloves, sporting goods, such as rubber balls, bathing suits and caps, and drug sundries.

The present invention is illustrated in various of its specific embodiments by Examples I through IV below, in each of which there was used a natural rubber tire carcass stock which had been formed on a two-roll rubber mill by blending 10 parts of a softener with a rubber composition made up of 80 parts smoked sheet, 10 parts rolled brown crepe, 20 parts whole tire reclaim, and 25 parts of carbon black, and thereafter milling into the composition 1 part stearic acid, 5 parts zinc oxide, 0.8 part mercaptobenzothiazole, 2.75 parts sulfur and 0.5 part Santoflex B, a reaction product of acetone and p-aminodiphenyl. One lot of each of these stocks was then cured for 20 minutes at the conventional vulcanizing temperature of 145° C. whereas another lot thereof was cured for the same length of time at the abnormally low vulcanizing temperature of 126° C. Samples developing a comparatively high tensile strength at such a low temperature as this are regarded as having an unduly high scorchiness.

EXAMPLE I

The softening agent used in preparing the rubber stock described in the preceding paragraph comprised 10 parts of a conventional pine tar material. As will be seen from the data given in Table I which follows Example IV, this composition had good tackiness properties and its Mooney scorch time at 121° C. (14 minutes) was good. As further evidence of a lack of scorchiness in the product, the sample vulcanized at 126° C. had the relatively low tensile strength of 1720 p. s. i.

EXAMPLE II

In this case, the rubber stock described above was compounded with 10 parts of a softener made up entirely of a "Duosol" extract obtained by treating an oil distillate with phenol and propane and then distilling off the phenol from the extract so obtained. The physical properties of the Duosol extract here employed as a rubber softener were as follows:

Specific gravity $D_4^{20}$ _____ 1.02
Viscosity, 210° F. (cs.) _____ 32
Flash point, °F _____ 475
Initial boiling point (1 mm. Hg) °F_____ 444

As will be seen from the data of Table I, the stock prepared with this softener was highly scorchy, it having the low Mooney scorch type of but 10.5 minutes and developing the high tensile strength of 2470 p. s. i. when cured at 126° C.

EXAMPLE III

In this example, the softener was made up of 5 parts of the Duosol extract described in Example II above and 5 parts of a naphthenic acid mixture derived on acidifying an alkali extract of petroleum and containing 27.6% neutral oil, the naphthenic acid mixture having an acid number of 146. On an acid-free basis, the acid number of the naphthenic acid would be 202. The overall naphthenic acid content of the softener on an oil-free basis was 36.2%. In preparing the rubber stock, the Duosol extract was added first and then the naphthenic acid was worked into the mixture. As shown in Table I, this stock had excellent anti-scorch properties, its Mooney scorch time being 16 minutes and the sample having a low tensile strength when cured at 126° C. In this respect the properties of the sample were much superior to those of the stock described in Example II, and they were even superior to those of the rubber compounded with pine tar, the commercially accepted softener. At the same time, the present stock had good tack and worked up and handled very well.

EXAMPLE IV

This stock was prepared in the same manner as that described in Example II except that here the quantity of Duosol extract was increased to 7.5 parts and the amount of napthenic acid was reduced to 2.5 parts, the resulting mixture therefore having an overall naphthenic acid content of 18.1% as determined on an oil-free basis. As may be noted from the data of Table I, this reduction in naphthenic acid considerably increased the scorchiness of the stock, though the condition was still considerably improved over that which prevails in the case of the rubber softened without any naphthenic acid whatsoever (Example II).

*Table 1.—Effect of naphthenic acid-petroleum residue softeners on physical properties of natural rubber tire carcass stock*

| Product described in | Example I, 100% Pine Tar | Example II, 100% Duosol extract | Example III, 36.2% naphthenic acid, 13.8% neutral oil and 50% Duosol extr. | Example IV, 18.1% naphthenic acid, 6.9% neutral oil, 75% Duosol extract |
|---|---|---|---|---|
| A. Unvulcanized Stock: | | | | |
| Tack | excellent | excellent | excellent | excellent |
| Scorch time (Mooney) min. at 121° C | 14 | 10.5 | 16 | 13 |
| B. Vulcanizate cured 20 min. at 145° C.: | | | | |
| Tensile strength, p. s. i | 2,445 | 2,255 | 2,770 | 2,450 |
| Elongation at break, per cent | 715 | 790 | 750 | 705 |
| Stress at 300% elongation, p. s. i. (modulus) | 200 | 200 | 290 | 210 |
| C. Vulcanizate cured 20 min. at 126° C.—Tensile strength, p. s. i. | 1,720 | 2,470 | 1,670 | 2,150 |

In Examples V through XII to follow, which are also illustrative of the present invention, there was employed a natural rubber tire tread stock which had been formed on a two-roll rubber mill by blending 10 parts of a softener with a rubber composition made up of 100 parts smoked sheet admixed with 50 parts of carbon black, and thereafter milling into the resulting plastic mass 1 part mercaptobenzothiazole, 1 part phenyl beta-naphthylamine, 5 parts zinc oxide, 4 parts stearic acid and 3 parts sulfur. One lot of each of these stocks was then cured for 30 minutes at the conventional vulcanizing temperature at 145° C. whereas another lot was cured for the same length of time at the relatively low vulcanizing temperature of 126° C. As was the case with the carcass stocks described in Examples I through IV above, those vulcanizates which developed a relatively high tensile strength when vulcanized at 126° C. are regarded as being unduly scorchy.

EXAMPLE V

The softening agent employed in this case was 10 parts of pine tar, the resulting softened rubber stock having good tackiness and a low Mooney scorch time. As further evidence of a lack of scorchiness in the product, the sample vulcanized at 126° C. had a relatively low tensile strength.

EXAMPLE VI

The softener employed in working up this stock was 10 parts of the naphthenic acid composition described above in Example III, the same containing 27.6% of a neutral oil and having an acid number of 146, the acid number of the material on an oil-free basis being calculated to be 202. While the stock prepared with this softener had good tack and excellent scorchiness properties, the vulcanizate was considered unsatisfactory because of its abnormally high modulus.

EXAMPLE VII

In this example the rubber was compounded with 5 parts of the naphthenic acid composition described in Example III and 5 parts of an asphalt petroleum residue. The latter residue, which contained 30% of a neutral oil which acted as a solvent for the asphalt, had the following physical properties:

| | |
|---|---|
| Specific gravity $D_4^{20}$ | 0.98 |
| Viscosity, 100° F. (cs.) | 3540 |
| Flash point, °F | 450 |
| Initial boiling point (1 mm. Hg), °F | 302 |

As will be seen from the data given in Table 2, this material had excellent all-around softener characteristics, the stock having a high Mooney scorch time and exhibiting good tack and workability, and the vulcanizate having a normal modulus.

EXAMPLE VIII

The rubber stock of this example was prepared using 2.5 parts of the naphthenic acid composition described in Example III and 7.5 parts of the asphalt solution described in Example VII, the overall content of naphthenic acid in the softener thus being 18.1% as measured on an oil-free basis. The action of this softener was generally the same as that of the 50/50 naphthenic acid-asphalt softener of Example VII, though here there was some evidence of an increase in scorchiness in the stock.

EXAMPLE IX

The softener employed in preparing the stock of this example represented 10 parts of the asphalt composition described in Example VII. As will be observed from the data presented in Table 2 the physical properties of this stock were generally unsatisfactory, its tackiness and workability not being up to commercial requirements and the scorchiness of the stock being relatively high.

EXAMPLE X

This rubber stock was prepared using 10 parts of a 60% solution in a neutral oil base of an asphalt petroleum residue, the solution having the following physical properties:

| | |
|---|---|
| Specific gravity $D_4^{20}$ | 1 |
| Viscosity, 100° F., (cs.) | 12,000 |
| Viscosity, 210° F. (cs.) | 58 |
| Flash point, °F | 405 |
| Initial boiling point (1 mm. Hg), °F | 340 |

As was the case with the stock prepared in the preceding example, this material also had poor tackiness. Further, as manifested both by a low Mooney scorch time and the extraordinarily high tensile strength (1825 p. s. i.) of the vulcanizate prepared at 126° C., the stock was very scorchy.

EXAMPLE XI

This stock was prepared using 7.5 parts of the asphaltic solution described in the preceding example and 2.5 parts of the naphthenic acid composition described in Example III, the softener having an overall naphthenic acid content of 18.1% as measured on an oil-free basis. As will be seen from the data of Table 2, the introduction of even this relatively small amount of naphthenic acid served to restore a normal degree of tackiness to the mixture while at the same time greatly improving its scorchiness characteristics.

EXAMPLE XII

This stock was prepared in the same fashion as that described in the preceding example except here there were employed 5 parts of the naphthenic acid solution and 5 parts of the asphalt solution, the softener thus containing 36.2% naphthenic acid as determined on an oil-free basis. The data presented in Table 2 shows the stock prepared with this softener to be satisfactory in every particular, it having good tack and workability coupled with a very low scorchiness.

from about 20 to 40% naphthenic acids, at least 15% of an aromatic petroleum derivative, and from 0 to 50% of a neutral petroleum oil, said aromatic petroleum derivative having a viscosity of at least 10 cs. at 210° F., softening below 200° F., and having a specific gravity ($d_4^{20}$) of from 0.9 to 1.05.

6. A softened rubber composition made up in the ratio of 100 parts rubber from 2 to 20 parts of a softener composition comprising from about 15 to 60% naphthenic acids, at least 15% of an aromatic petroleum derivative, and from 0 to 50% of a neutral petroleum oil, said aromatic petroleum derivative having a viscosity of at least 10 cs. at 210° F., softening below 200° F., and having a specific gravity ($d_4^{20}$) of from 0.9 to 1.05.

7. The composition of claim 6 wherein the petroleum residue is an asphaltic material.

8. The composition of claim 6 wherein the petroleum residue is an extract obtained by treating petroleum with propane and phenol.

9. The composition of claim 6 wherein the petroleum residue is an Edleaneau extract.

FRANK M. McMILLAN.
DE LOSS E. WINKLER.

Table 2.—*Effect of naphthenic acid-petroleum residue softeners in physical properties of natural rubber tire tread stock*

| Product described in | Example V, 100% Pine tar | Example VI, 72.4% naphthenic acid, 27.6% neutral oil | Example VII, 36.2% naphthenic acid, 35% asphalt, 28.9% neutral oil | Example VIII, 18.1% naphthenic acid, 52.5% asphalt, 18.1% neutral oil | Example IX, 70% asphalt, 30% neutral oil | Example X, 60% asphalt, 40% neutral oil | Example XI, 18.1% naphthenic acid, 45% asphalt, 36.9% neutral oil | Example XII, 36.2% naphthenic acid, 30% asphalt, 33.8% neutral oil |
|---|---|---|---|---|---|---|---|---|
| A. Unvulvanized stock: | | | | | | | | |
| Tack | good | good | good | good | only fair | only fair | good | good |
| Scorch time (Mooney) min. at 121° C. | 48 | 48.5 | 54 | 52 | 44 | 44 | 45 | 51 |
| B. Vulcanizate cured 30 min. at 145° C.: | | | | | | | | |
| Tensile strength, p. s. i. | 3,500 | 3,690 | 3,835 | 3,970 | 3,720 | 3,745 | 3,885 | 3,785 |
| Elongation at break, per cent | 650 | 550 | 665 | 670 | 690 | 680 | 665 | 665 |
| Stress at 300% elongation, p. s. i. (modulus) | 940 | 1,420 | 1,010 | 1,020 | 870 | 1,050 | 1,080 | 1,060 |
| C. Vulcanizate cured 30 min. at 126° C.— | | | | | | | | |
| Tensile strength, p. s. i. | 450 | 285 | 670 | 715 | 815 | 1,825 | 1,555 | 665 |

The various parts and percentages expressed herein and in the appended claims are on a weight basis unless otherwise indicated.

The invention claimed is:

1. A rubber softening composition comprising from about 15 to 60% naphthenic acids, at least 15% of an aromatic petroleum derivative, and from 0 to 50% of a neutral petroleum oil, said aromatic petroleum derivative having a viscosity of at least 10 cs. at 210° F., softening below 200° F., and having a specific gravity ($d_4^{20}$) of from 0.9 to 1.05.

2. The composition of claim 1 wherein the petroleum residue is an asphaltic material.

3. The composition of claim 1 wherein the petroleum residue is an extract obtained by treating petroleum with propane and phenol.

4. The composition of claim 1 wherein the petroleum residue is an Edleaneau extract.

5. A rubber softening composition comprising

REFERENCES CITED

The following references are of record in the file of this patent:

UNITED STATES PATENTS

| Number | Name | Date |
|---|---|---|
| 1,815,778 | Kinney | July 21, 1931 |
| 1,847,599 | Dunham | Mar. 1, 1932 |
| 1,847,600 | Dunham | Mar. 1, 1932 |
| 2,153,141 | Engel | Apr. 4, 1939 |
| 2,303,551 | Houghton | Dec. 1, 1942 |
| 2,438,753 | Kellog | Mar. 30, 1948 |
| 2,447,732 | Campbell et al. | Aug. 24, 1948 |

FOREIGN PATENTS

| Number | Country | Date |
|---|---|---|
| 574,052 | Great Britain | Dec. 19, 1945 |